United States Patent [19]

Bouyoucos

[11] 3,946,831
[45] Mar. 30, 1976

[54] ACOUSTIC TRANSMITTER
[75] Inventor: John V. Bouyoucos, Rochester, N.Y.
[73] Assignee: Hydroacoustics Inc., Rochester, N.Y.
[22] Filed: May 6, 1974
[21] Appl. No.: 466,938

Related U.S. Application Data
[62] Division of Ser. No. 276,457, July 31, 1972.

[52] U.S. Cl. ............... 181/120; 181/400; 181/402; 340/8 R; 340/5 R; 340/384 R
[51] Int. Cl.² .................... H04B 13/02; G01V 1/02
[58] Field of Search .......... 181/113, 115, 120, 142, 181/402, 400; 340/4 R, 5 R, 384 R, 15

[56] References Cited
UNITED STATES PATENTS
2,789,651   4/1957   Daniels ........................... 181/198
3,517,390   6/1970   Whitehead .................... 340/384 R Primary Examiner—T. H. Tubbesing
Assistant Examiner—H. A. Birmiel
Attorney, Agent, or Firm—Martin LuKacher

[57] ABSTRACT

A transmitter of acoustic energy which propagates that energy in a directional manner is described. An acoustic signal generator is connected at one end of an acoustic transmission line which exhibits a certain characteristic impedance. The line has a number of ports spaced along its length. Surrounding each port is a coupler section which is antiresonant at the driven frequency and which presents a high acoustic driving point impedance to its associated port. In one embodiment, the interior diameter of the line is changed following each port as to make the acoustic pressure along the line and at each port constant, and the acoustic energy radiated in each coupler equal. Accordingly, acoustic energy is partitioned evenly at each port so as to define an array of equal strength radiators having directional acoustic signal propagating characteristics.

13 Claims, 22 Drawing Figures

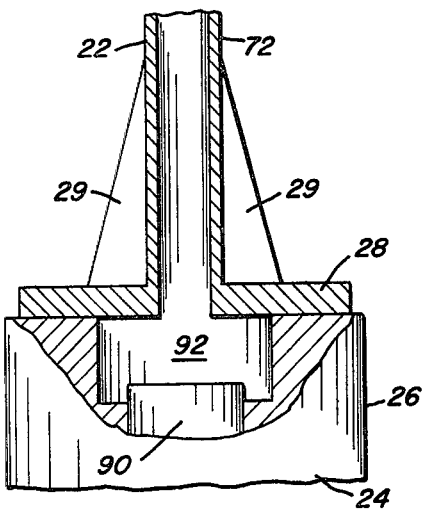
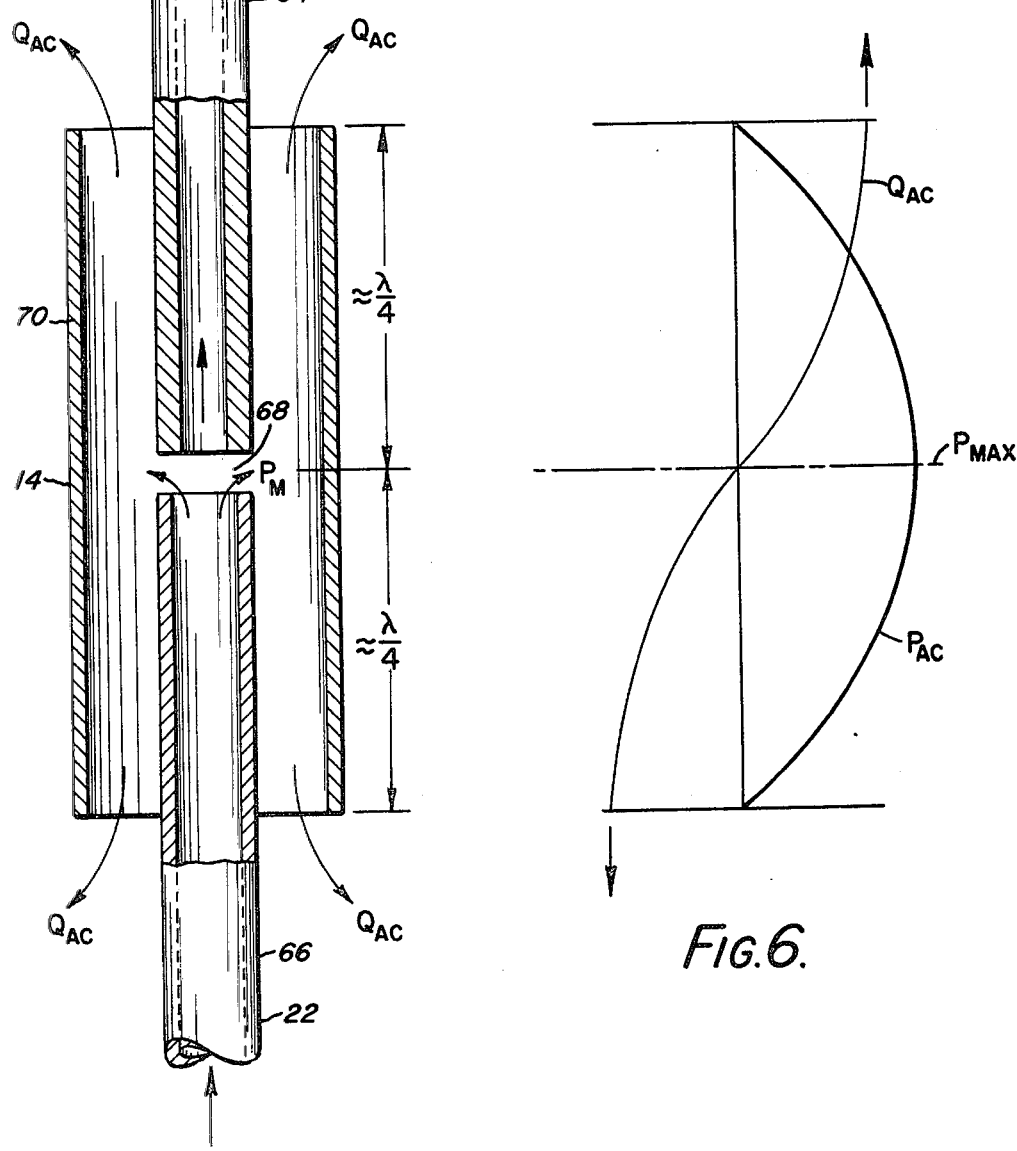

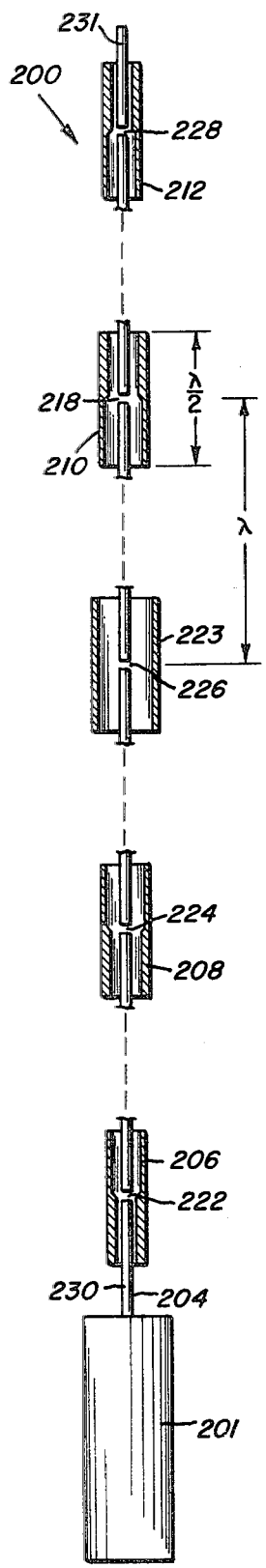
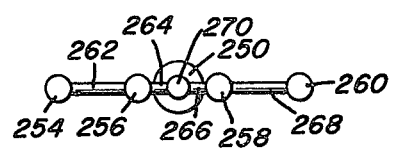
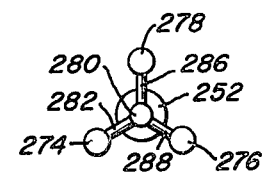
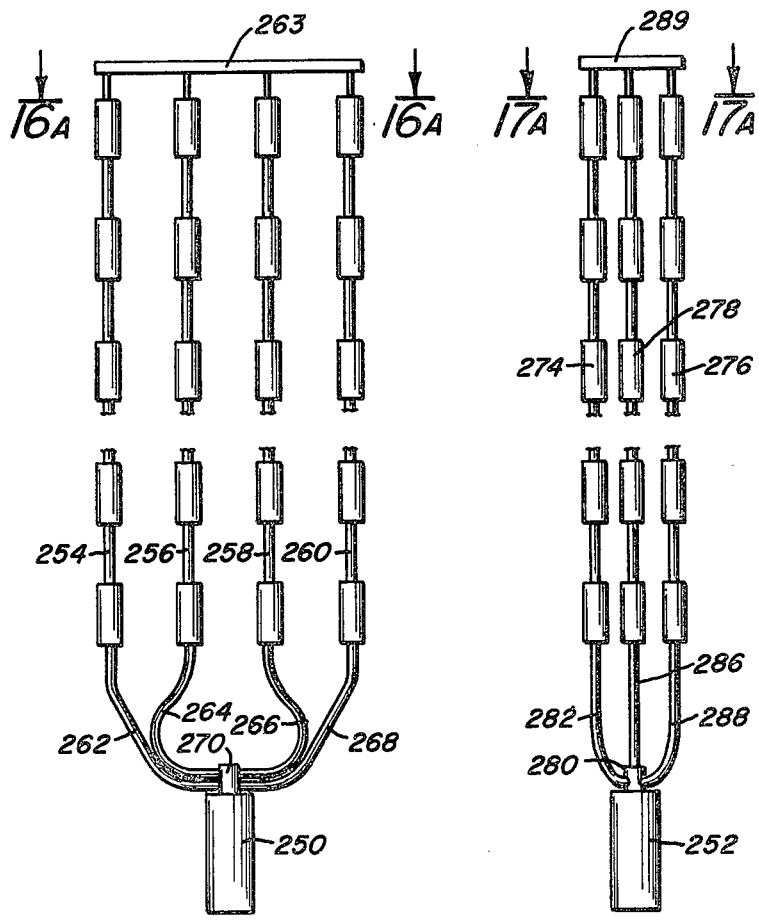
FIG. 14.  FIG. 16A.  FIG. 17A.  FIG. 16.  FIG. 17.

ACOUSTIC TRANSMITTER

This case is a division of application Ser. No. 276,467, filed July 31, 1972.

The present invention relates to acoustic apparatus and particularly to a directional transmitter of acoustic energy.

The invention is especially suitable for providing directional transmission of acoustic energy from a single high power acoustic source for underwater applications such as sonar and long-range signalling. Aspects of the invention include transmitting acoustic energy from a source efficiently into a fluid medium, either gaseous or liquid, which acoustic transmission may have directional propagational characteristics and in which the direction of propagation may be steered or shifted.

Conventionally, directional sources of acoustic energy have utilized arrays of separate acoustic transducers which translate electrical signals into acoustic waves properly phased to propagate in desired directions. Alternatively, reflectors have been used to provide for directivity. Acoustic arrays are complex and expensive in that they require large numbers of transducers, especially where high power is needed. Conventional arrays also require electrical phase control systems in order to obtain controlled directivity from the array. Reflectors for long range underwater use are generally extremely large in size, thus making them difficult to handle at sea. In addition, the efficiency of reflector systems at desired operating depths is frequently quite low.

Accordingly, it is an object of the present invention to provide an improved transmitter of acoustic energy.

It is another object of the present invention to provide an improved acoustic transmitter suitable for radiating acoustic energy in underwater applications.

It is a further object of the present invention to provide an improved acoustic transmitter which can exhibit directional transmission characteristics.

It is a still further object of the present invention to provide an improved acoustic transmitter capable of radiating acoustic signals at high power.

It is a still further object of the present invention to provide an improved acoustic transmitter having higher efficiency than radiators which have heretofore been provided and which has directional radiating characteristics.

It is a still further object of the present invention to provide an improved acoustic transmitter which may readily be deployed underwater, the performance of which is not degraded at great operating depths.

It is a still further object of the present invention to provide an improved acoustic transmitter of directional energy which is relatively low in weight and can be made compact in size.

It is a still further object of the present invention to provide an improved directional acoustic transmitter which propagates a beam of acoustic energy, which beam can be steered to a desired direction of propagation.

The invention itself both as to its organization and method of operation, as well as additional objects and advantages thereof, will become more readily apparent from a reading of the following description in connection with the accompanying drawings in which:

FIG. 4 is a fragmentary sectional view illustrating the lower end of the transmitter shown in FIG. 2;

FIG. 5 is a diagrammatic sectional view, enlarged to illustrate the process of acoustic radiation from the transmitter illustrated in FIG. 2;

FIG. 6 shows a pair of curves illustrating the pressure and volume velocity distribution along the portion of the acoustic transmitter illustrated in FIG. 5;

FIG. 14 is a simplified fragmentary sectional view of an acoustic transmitter in accordance with another embodiment of the invention whereby the amplitude of the transmitted acoustic energy may be controlled to shape the radiation pattern produced by the transmitter;

FIGS. 16 and 16A are views from the front and top, respectively, of a planar array acoustic transmitter in accordance with the invention;

FIGS. 17 and 17A are views from the front and top, respectively, of a volumetric array acoustic transmitter in accordance with the invention.

Figure 1:
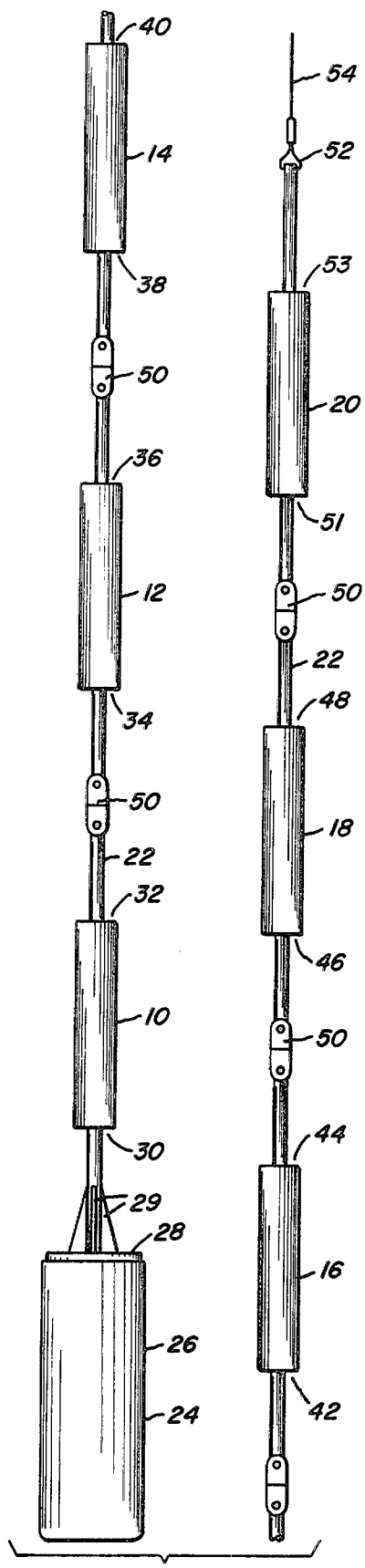
FIG. 1 is a front view of an acoustic transmitter provided in accordance with the invention.

An embodiment of acoustic apparatus embodying the invention which is adapted for underwater application is shown in FIG. 1. This apparatus is an acoustic transmitter having directional sound radiating properties. The transmitter is capable of construction so as to propagate acoustic waves at any frequency throughout the entire acoustic frequency range; the term "acoustic" should be taken to include frequencies in the audio, infrasonic as well as in the ultrasonic frequency range. The transmitter includes an array of antiresonant couplers 10, 12, 14, 16, 18 and 20. These couplers may be thought of as acoustic antennas or radiators. A plurality of the couplers are provided to form the array. In the embodiment illustrated in FIG. 1, six (6) couplers, 10, 12, 14, 16, 18, and 20 are provided and are spatially distributed along an acoustic transmission line 22 which is driven by an acoustic signal generator 24.

The acoustic signal generator 24 is contained in a cylindrical housing 26 which is connected by a plate 28, having gussets 29, to the lower end of the line 22. Opposing radiating surfaces 30, 32, 34, 36, 38, 40, 42, 44, 46, 48, 51, and 53 are preferably separated by a distance equal to or less than one-half wavelength of the acoustic signals generated by the source 24 in the medium surrounding the apparatus. The couplers 10, 12, 14, 16, 18 and 20 are fed at high impedance drive points by ports, the construction of which will be discussed hereinafter, from the line 22.

The couplers each may be characterized as two port structures which are disposed in parallel relationship in an acoustic circuit sense. The output ports are disposed in this illustrated embodiment at the opposite ends of each of the couplers. The opposing radiating surfaces 30, 32; 34, 36; 38,40; 42,44; 46,48; 51,53; being parts of the output ports of their respective couplers. These output ports provide a large acoustic volume velocity injection into a relatively low impedance radiation load, such as sea water in which the transmitter is immersed. The input port is located at the center of each coupler and presents a relatively high drive impedance to the drive ports located along the acoustic transmission line. The characteristic impedance of the transmission line 22 at any position along its length and the drive point impedances presented to the line at the successive ports along the line are coordinated and correlated with each other so as to partition the acoustic energy from the generator 24 into the several couplers 10, 12, 14, 16, 18 and 20, and to minimize the standing wave ratio in the line 22, thus minimizing reflected energy. In the embodiments of the invention illustrated in FIGS. 1 to 12, the cross-sectional area of the acoustic transmission line changes at each port so as to obtain the desired net acoustic impedance for partitioning equally the acoustic energy into each of the couplers. Other partitioning arrangements may be used whereby, for example, the energy radiated from each coupler may be different, thereby providing for shading of the radiation from the openings along the line to control the side-lobes of the directional transmission.

Figure 7:
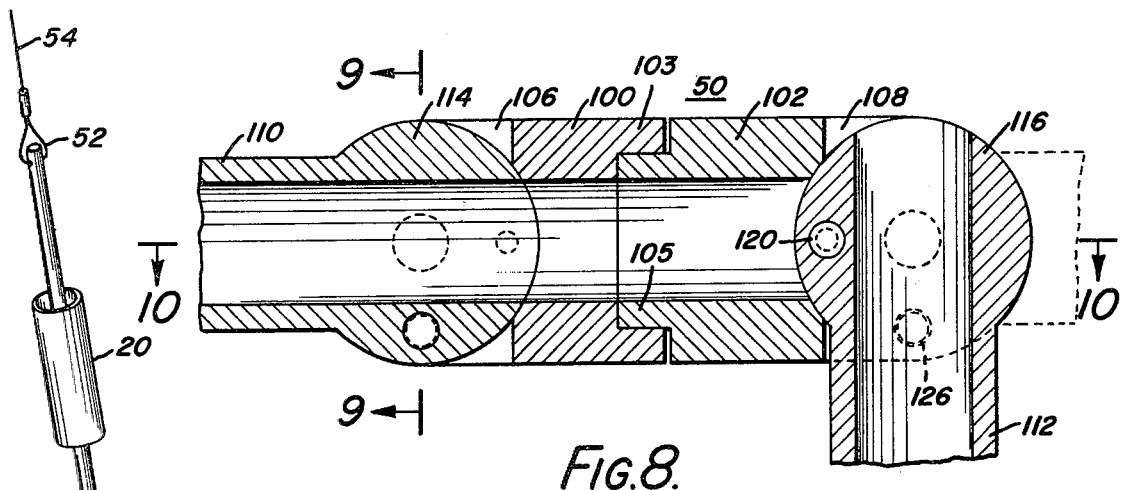
FIG. 7 is a perspective view of the acoustic transmitter shown in FIGS. 1 and 2 in the process of being deployed into operating position.

Joints 50 are provided between adjacent sections of the line so as to permit the lines and the couplers thereon to be stored in a compact package as shown in FIG. 7. A hawser 52 is connected at the upper end of the line 22, and this hawser may be connected by a length of line 54 to a floating object such as a buoy. The length of line 54 between the hawser 52 and the buoy best determines the depth at which the transmitter is deployed. During the deployment, as the more massive housing 26 descends into the water, the several joints 50 successively articulate into extended position (see FIG. 7).

Figure 2:
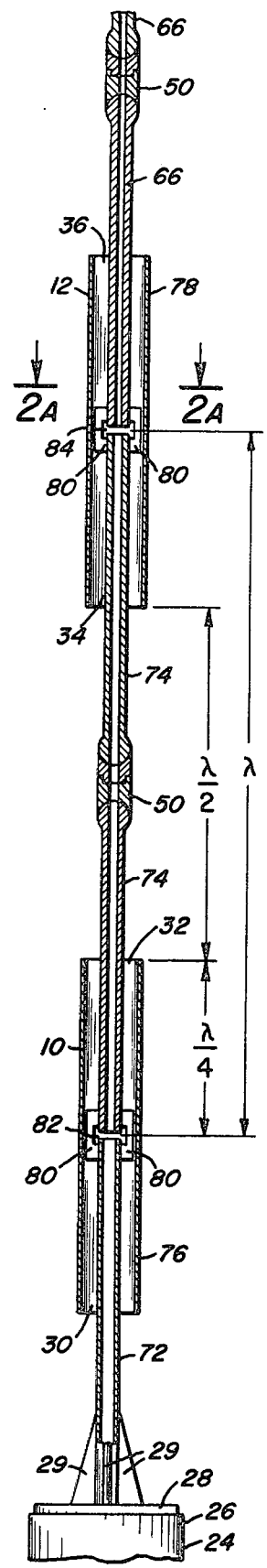
FIG. 2 is a fragmentary, front sectional view of the transmitter shown in FIG. 1.

As will be more apparent from FIG. 2, the transmission line will be liquid filled when the transmitter is deployed under water. It is a feature of the invention that the transmitter as provided in accordance therewith is depth independent, such that its performance is not degraded even when deployed at great (deep) ocean depths. This feature is attributable to the liquid filled line 22 and couplers. The generator 24 may also be liquid filled. Thus pressure release mechanisms which are used in deep submergence acoustic devices have been eliminated in accordance with the invention.

When the transmitter is extended into operating position, the extended operating position being shown in FIG. 1, the equal partitioning of acoustic energy to each of the couplers 10, 12, 14, 16, 18 and 20 results in an array of equal strength radiators providing for a directional radiating pattern. When the drive or input ports of the individual couplers are spaced a wavelength apart relative to the axial longitudinal speed of sound within the liquid within the transmission line 22, the principal lobe of the pattern is symmetrical about a plane through the center of the array. The plane is perpendicular to the line 22 and intersects the line half the distance between the adjacent radiating surfaces 40 and 42 of the couplers 14 and 16. This radiation pattern is illustrated in FIG. 13 wherein the entire array including the line and the couplers is illustrated by a cylinder 56 and the housing 26 containing the signal generator 24 is represented by a circle 58.

Figure 13:
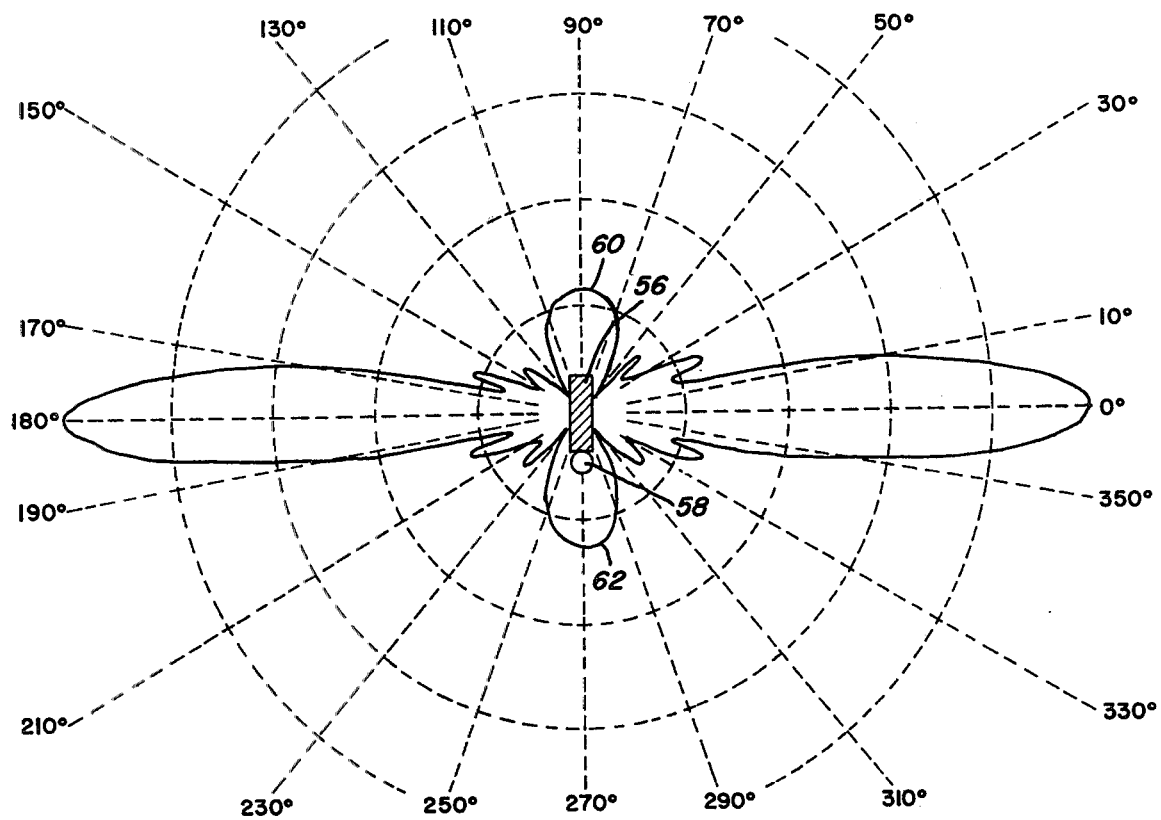
FIG. 13 is a curve showing a typical radiation pattern of the transmitter shown in FIGS. 2 and 11.

Consider the directional characteristics of the array (see FIG. 2 and FIG. 13). The acoustic signal experiences a delay as it passes up the line 22 between each of the input ports (82 and 84 for example) of successive couplers (10 and 12 for example). When this delay corresponds to one wavelength or 360° at the speed of sound in the fluid within the line 22, the signals at the input ports of the successive couplers, although delayed in time with respect to each other, are in like phase relationship. Inasmuch as the sources of acoustic signals from all of the driving ports are in the same phase, the signals emanate and are transmitted from the array in additive relationship in a plane normal to the axis of the array (the axis of the line 22), which plane bisects the array. Thus, the directional characteristic shown in FIG. 13 is obtained. Steering of the pattern (viz., changing the angle which the axis of the beam makes with the axis of the array) may be accomplished by changing the spacing of the couplers or the frequency of the acoustic signal.

In the event that there exists a mutual coupling between the couplers 10 through 20, the effective amplitude of acoustic energy from each coupler may vary slightly from equality. This variation can be minimized by changes in spacing between the couplers or changing coupler dimensions.

The basic building block of the array is diagrammatically shown in FIGS. 5 and 6. This building block consists of one of the couplers, the coupler 14 being taken by way of example, and two adjacent sections 64 and 66 of the transmission line 22. The line 22 itself is tubular and is made up of a plurality of tubular sections, except for the section at the upper end of the line which is a solid cylindrical rod for reasons which will be discussed more fully hereinafter. The successive line sections each have a different internal cross-sectional area and the gaps between the line sections (the gap 68 between the adjacent ends 64 and 66) provide the ports in the line.

The couplers are annular members; the coupler 14, as shown in FIG. 5, is a substantially rigid cylindrical tube 70 which surrounds the line 22. The tube 70 provides an interior fluid-filled annulus between the line and the inner periphery of the tube 70. The distance from the port (the center of the gap 68) to each end of the annular fluid column is set at approximately ¼ wavelength at the design driving frequency, and, more particularly, at a length whereby the fluid annular column is in anti-resonance. Such antiresonance provides an input or a driving point impedance at the column midpoint which is of high acoustic impedance.

The pressure and volume velocity distributions along the annular column are shown in FIG. 6 which is drawn to the same scale as FIG. 5. FIG. 6 shows that the maximum acoustic volume velocity, $Q_{AC}$, occurs at the radiating surfaces of the ends of the coupler and that the volume velocity ejection into the radiation load (sea water) at each end is in the same phase. The maximum acoustic pressure $P_{MAX}$ is at the midpoint of the column corresponding to the driving port location in the line 22, thus showing that the drive point location is the point of highest impedance. Preferably the physical length of the coupler tube 70 (from end to end) is slightly shorter than one-half wavelength at the drive frequency to account for the mass components of the radiation load, and to enable a nominally tuned resistive load to be presented at the drive port of the transmission line.

To minimize acoustic reflection at each port in the transmission line, the drive point impedance presented at the drive port of each coupler and the cross-sectional area of the transmission line section immediately following that port are sized so as to present at that drive port a total load matched to the nominal characteristic impedance of the transmission line section immediately preceding said port.

Under the aforementioned preferred operating condition of column antiresonance, the drive point impedance $Z_{DP}$ presented to the drive port is resistive and may be expressed as $R_{DP}$. For n couplers, each exhibiting the same drive point resistance $R_{DP}$, the magnitude of this resistance is chosen relative to the characteristic impedance, $Z_{OL}^{(0)}$, of the first section 72 of the transmission line by the relationship $$Z_{OL}^{(0)} = \frac{\rho c}{A_{OL}^{(0)}} = \frac{R_{DP}}{n} \qquad (1)$$

where $\rho c$ is the specific characteristic impedance of the fluid in the line and $A_{OL}^{(0)}$ is the cross-sectional area of the transmission line section preceding the first port (viz., section 72 FIG. 2).

Then, to achieve the desired matched condition, it can be shown that the line cross-sectional area, $A_{OL}^{(j)}$ following the $j^{th}$ port is given by the expression $$A_{OL}^{(j)} = \frac{n-j}{n} A_{OL}^{(0)} \qquad (2)$$

Under the above conditions, the transmission line is matched along its length so that standing waves are minimized, the acoustic pressure is constant along the line length, and equal acoustic power is delivered to each port. From the above equation, the line section following the last coupler ($j = n$) has zero area indicating that the transmission line is capped at this point and that all the input energy to the line has been distributed evenly to the n ports.

Under the foregoing conditions, the acoustic power, $W_{AC}$, delivered to the line is given by $$W_{AC} = \frac{1}{2} \frac{\hat{P}_{AC}^2}{Z_{OL}^{(0)}} \qquad (3)$$

where $P_{AC}$ is the peak acoustic pressure signal incident upon the first section 72 of the transmission line. Since $P_{AC}$ has been constrained to be constant along the line, the power, $W_{AC}^{(j)}$, delivered at the $j^{th}$ port to its corresponding coupler is $$W_{AC}^{(j)} = \frac{1}{2} \frac{\hat{P}_{AC}^2}{R_{DP}} \qquad (4)$$

Upon substitution of Equations (1) and (3) into Equation (4)

$$W_{AC}^{(j)} = \frac{W_{AC} \, Z_{OL}^{(1)}}{R_{DP}} \qquad (5)$$

or $$W_{AC}^{(j)} = \frac{W_{AC}}{n}$$

Illustrating the equal partitioning of power to each port.

Figure 3:
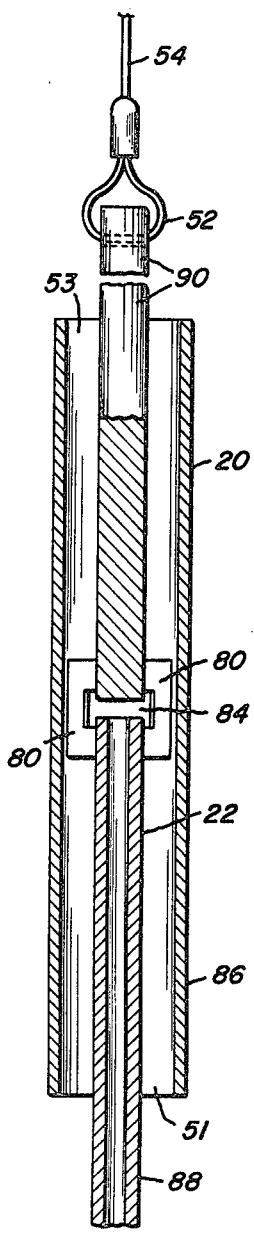
FIG. 3 is a fragmentary, sectional front view of the upper end of the acoustic transmitter as illustrated in FIG. 1.

FIG. 2 illustrates the couplers in greater detail. Only the first two couplers 10 and 12 are shown. The configuration of the next 3 couplers 14, 16, and 18 is similar. FIG. 3 shows the last coupler 20 at the upper end of the array.

Figure 2A:
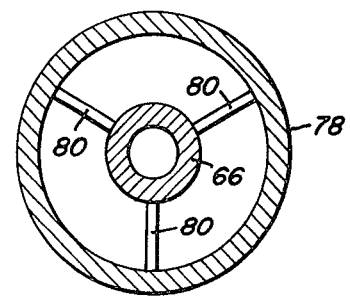
FIG. 2A is a sectional view taken along the line 2A—2A in FIG. 2.

The line has a first section 72, and a second section 74 which contains the first of the articulated joints 50. The first coupler 10 is a cylindrical tube 76 similar to the tube 70 shown in FIG. 5. The second coupler 12 is provided by another of these tubes 78. The sections of the line 22 are assembled together in series to form the total line. This assembly is accomplished by webs 80 which bridge the gaps between the line sections which provide the drive ports in the line. These webs may be fastened as by welding to the tubes 76 and 70 and their adjacent line sections 72, 74 and 66 (see FIG. 2A). Each of these webs is a C-shaped member with the outer side of the member connected to the tubes 76 and 78 and the inner side legs of each web connected to the outer peripheries of the line sections.

The midpoint of each coupler tube is at the location of a driving port. Thus, the first port 82 is disposed at the midpoint of the tube 76 and the second port 84 is disposed at the midpoint of the tube 78. The distance between midpoints of the individual couplers (that is the distance between the ports 82 and 80) are spaced nominally one wavelength apart to provide equal phase volume velocity injection from the line 22 into the drive ports and, hence, from each annular coupler into the radiation load. The opposing ends of each coupler tube are separated by a distance equal to approximately a half wavelength which, of course, corresponds to twice the antiresonant length of the coupler annular fluid column. The array illustrated in FIGS. 1 and 2 provides 12 radiating spots of nominally equal acoustic strength spaced one-half wavelength apart for a total array length from the lower end of the coupler 10 to the top end of the coupler 20 of approximately 5½ wavelengths.

The last coupler 20 at the upper end of the line (see FIG. 3) is configured similarly to the other couplers. This last coupler is made up of a cylindrical tube 86 having its midpoint at the gap between the next to the last section 88 of line 22 and the last section 90 of the line. The last section 90 is a solid cylindrical rod having zero internal cross-sectional area as provided for by the equation (2) above dictating the cross-sectional area of the line. The line sections 88 and 90 are assembled by means of webs 80 as described in connection with couplers 10 and 12.

The lower end of the transmitter is illustrated in FIG. 4. The housing 24 contains a transducer with its associated power pack. This transducer may be of the electrostrictive type as exemplified by electrostrictive transducers having piezoelectric elements which are vibrated by an electric signal, or a hydroacoustic transducer of the type illustrated in U.S. Pat. No. 3,105,460 issued in the name of J. V. Bouyoucos on Oct. 1, 1963. These transducers have an output piston 90 which vibrates at the desired frequency or frequencies of acoustic waves which are to be propagated. The signal generator has an output cavity 92 which is filled via the line through the openings therein with the fluid in which the entire array is immersed (e.g., sea water), which enters the line and the cavity 92 through the gaps between the various line sections. Accordingly, when the transducer of which the piston 90 is a part (e.g., the output piston — see element reference numeral 32 in U.S. Pat. No. 3,105,460) is vibrated, acoustic energy is generated which propagates along the line 22. Alternatively the output cavity 92 may be driven directly from the output cavity (viz. cavity 30 of U.S. Pat. No. 3,105,460) without interposition of a piston.

Figure 8:
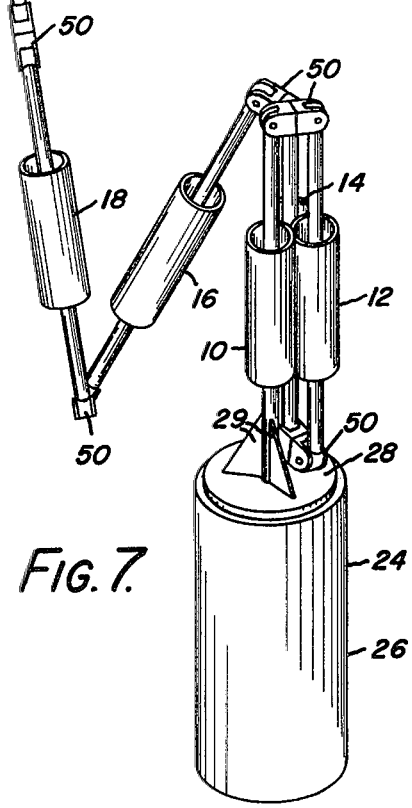
FIG. 8 is a fragmentary cross-sectional view of a portion of the transmitter shown in FIG. 1 which illustrates one of the articulated joints which is used in the transmitter.
Figure 9:
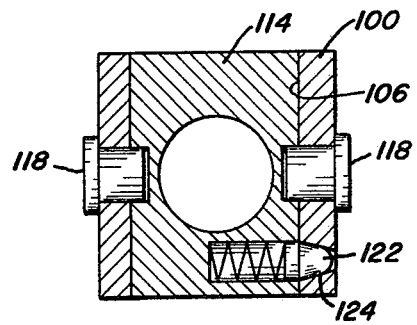
FIG. 9 is a sectional view taken along the line 9—9 in FIG. 8.
Figure 10:
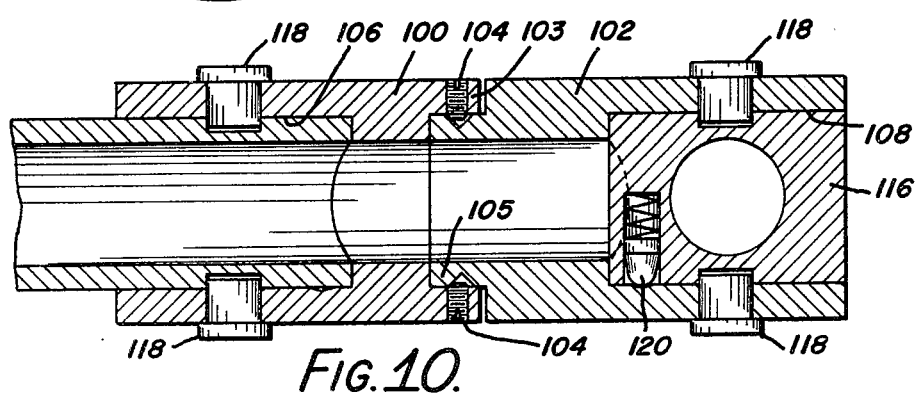
FIG. 10 is a sectional view taken along the line 10—10 in FIG. 8.

One of the articulated joints 50 is shown in FIGS. 8, 9 and 10. Each joint is made up of two parts 100 and 102. Each part has a separate cylindrical socket 106 and 108. The ends 110 and 112 of the line sections utilizing the joint are formed with discs 114 and 116 which are rotatably mounted in respective sockets 106 and 108 by means of flanged pins 118. The disc 114 on the left hand side of the joint 50 is shown in extended position, while the disc 116 on the right hand side of the joint is shown in folded position. The two parts 100 and 102 are also rotatable with respect to each other about their longitudinal axis. The parts 100 and 102 have overlapping cylindrical sections 103 and 105, which provide bearing surfaces. A pair of set screws 104 prevents the overlapping sections 103 and 105 from separating as the parts rotate.

Each of the discs carries a separate spring-loaded pin 120 and 122. When the discs rotate 90° from the packaged or compressed position, which is the position of the disc 116, to the extended and deployed or operating position, which is the position of the disc 114, the pins fall into a cooperating hole (hole 124 being provided in the case of the pin 122, and hole 126 in the case of the pin 120.) The line sections 110 and 112, the discs 114 and 116, and the parts 100 and 102, each have a central line passage of the same diameter and cross-sectional area. All of these passages become coaxial and aligned with each other when the discs 114 and 116 rotate into deployed position with their pin arrangements 120 and 122 locked in position. Once deployed, the pin arrangements 120 and 122 maintain the discs in locked position.

The operation of the articulated joints may be observed in FIG. 7. In packaged or undeployed position the axes of the discs and their associated line sections are perpendicular to the axis of the body parts 100 and 102. In the course of being deployed the body part and discs turn; the discs turning 90° until they become locked by their pin arrangements in deployed position.

Figure 11:
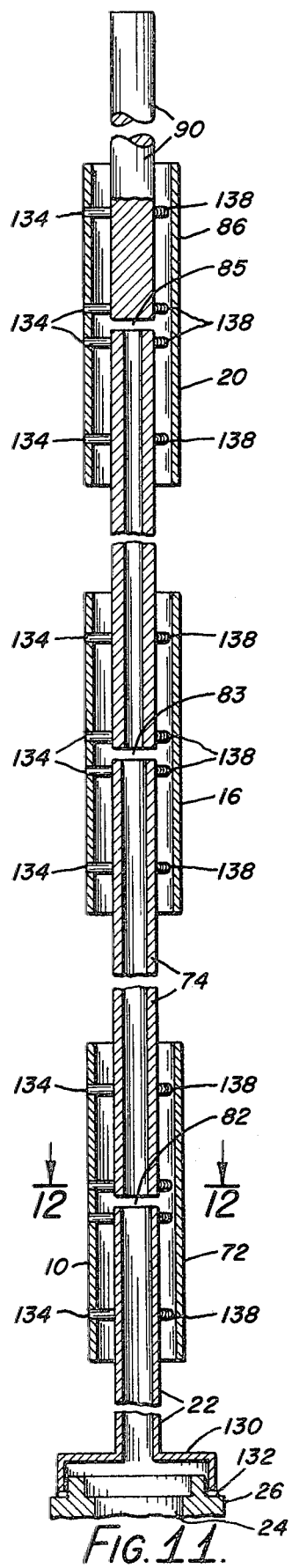
FIG. 11 is a fragmentary sectional view of an acoustic transmitter similar to the transmitter shown in FIGS. 1 and 2 which is assembled through the use of mounting bolts between the coupler and line rather than bridging members as shown in FIG. 2.
Figure 12:
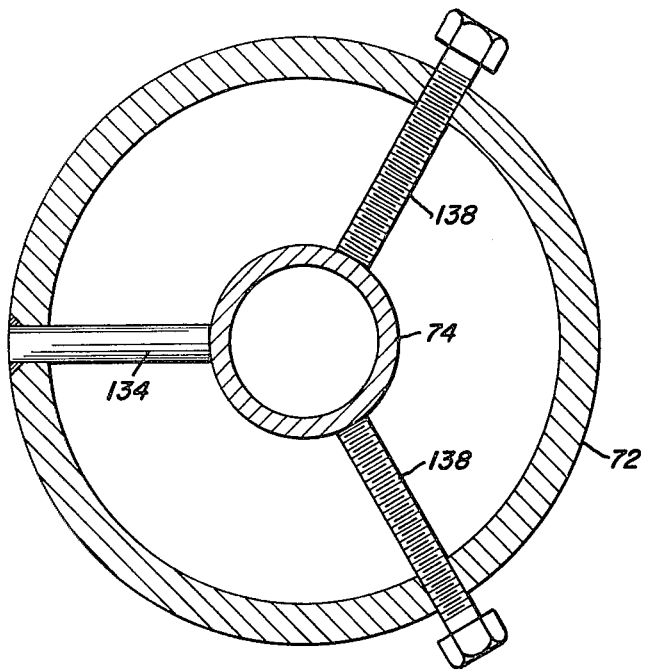
FIG. 12 is a sectional view of the transmitter shown in FIG. 11, the section being taken along the line 12—12 in FIG. 11.

A transmitter essentially similar to the transmitter described above in connection with FIGS. 1 through 10 and 13, but differing therefrom in the means by which the line sections are assembled to the annular tubes which provide the couplers, is shown in FIGS. 11 and 12. As discussed above, the line sections have like outside diameters but progressively smaller inside diameters to afford the cross-sectional area relationships determined by the above equations so as to provide equal impedances and equal partitioning of acoustic energy from the source 24. The first line section 22 may have a cup-shaped end 130 which is threaded into the upper end of the housing 26. A seal is provided by an O-ring 132. This assembly may be more convenient than the plate 28 and webs 29 in some applications.

The rigid tubes forming the couplers 10 to 20 are fastened to the line sections by a pin and bolt arrangement. Four pins 134 extend along radial lines to the line sections. The axis of each of the pins 134 may be in the same plane. Two of the pins 134 are located on opposite sides of the midpoint of each tube and two near the ends of the tubes. A pair of bolts 136 and 138 are provided to cooperate with each of the pins 134. These bolts extend along radial lines and through threaded holes in their respective coupler tubes. The axes of the bolts 136 and 138 are in the same horizontal plane as the axes of the pins 134 and are spaced 120° apart. The pin and bolt arrangement allows for adjustment of the size of the gaps between the line sections which provide the ports 82 in the line adjacent to coupler 10 and the ports 83 and 85 in the sections adjacent to the upper couplers 16 and 20. The assembly arrangement utilizing the pin and bolts also gives some latitude and tolerance in the adjustment of the ends of adjacent ones of the couplers. The apparatus shown in FIGS. 11 and 12 is especially adapted for use in the design of acoustic transmitters of different size, line section lengths, coupler spacings, different numbers of coupler sections, and otherwise having new or different parameters. The optimum spacings and dimensions of various parts of the acoustic source may be readily determined with the apparatus shown in FIGS. 11 and 12.

Figure 15:
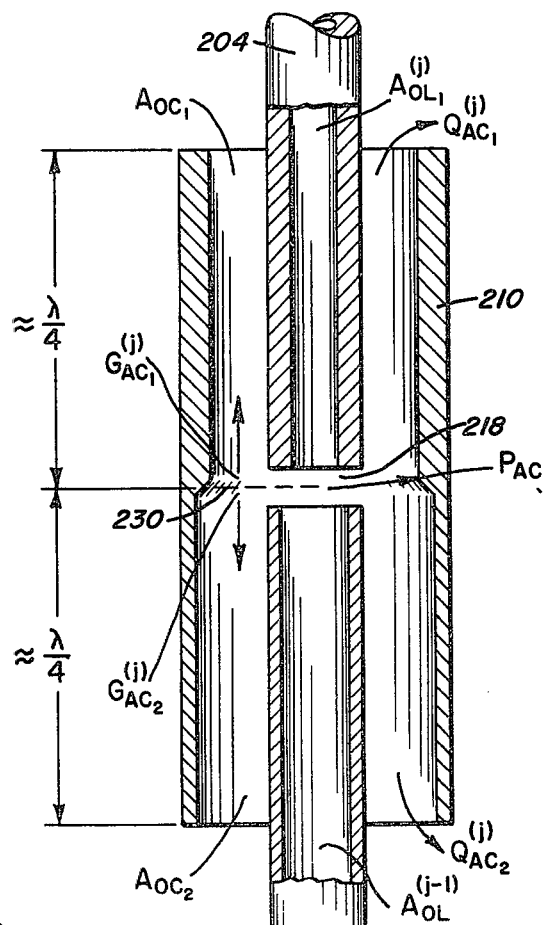
FIG. 15 is a diagrammatic sectional view of one of the units of the transmitter shown in FIG. 14.

FIGS. 14 and 15 illustrate an acoustic transmitter embodying the invention which is adapted for amplitude shading to provide control of the level of the side lobes of the radiation pattern of the transmitter.

The acoustic transmitter 200 shown in FIG. 14 has means for partitioning the acoustic energy unequally, thus shading the array and controlling the side lobes of the directional radiation pattern. By non-symmetric partitioning the directional transmission may be sterred upwardly and downwardly. Also the vertical height (beamwidth) of the pattern may be controlled by appropriately partitioning the energy from each of the couplers.

In an acoustic transmitter adapted for amplitude shading, similarly with the transmitter described above, the reflection of energy at each input or drive port from the liquid-filled line is minimized. Thus the driving acoustic pressure at each port and to each coupler is the same value. Stated generally, for both the case where each coupler radiates equal levels of acoustic energy as discussed in connection with FIGS. 2 and 5, and the amplitude shaded transmitter, this condition pertains when the sum of the driving point admittance $Y_{AC}^{(j)}$ of the $j^{th}$ drive port and the driving point admittance $Y_{AL}^{(j)}$ of the next (in a direction away from the generator) section of the line equal the characteristic admittance $Y_{0L}^{(j-1)}$ of the preceding section of the line, or $$Y_{0L}^{(j-1)} = Y_{AC}^{(j)} + Y_{AL}^{(j)} \qquad 6.$$

The imaginary parts of $Y_{AC}^{(j)}$ and $Y_{AL}^{(j)}$ are preferably zero. The antiresonant condition of the couplers insures that $Y_{AC}^{(j)} = G_{AC}^{(j)}$ where $G_{AC}^{(j)}$ is the driving point conductance of $j^{th}$ coupler at the $j^{th}$ drive port. There being no reflections and standing waves in the line the driving point admittance $Y_{AL}^{(j)}$ equals the characteristic conductance $G_{OL}^{(j)}$ of the $j^{th}$ line section. These relationships may be stated as $$G_{AL}^{(j)} = G_{OL}^{(j)} = \frac{1}{R_{OL}^{(j)}} \quad (7)$$

$$R_{OL}^{(j)} = Z_{OL}^{(j)} = \frac{\rho c}{A_{OL}^{(j)}}$$

where $\rho c$ is the specific characteristic impedance presented by the liquid filling the line and $A_{OL}^{(j)}$ is the cross-sectional area of the interior of the $j^{th}$ line section.

By combining equations (6) and (7) the transmission line design equation is derived, namely $$A_{OL(j)} = A_{OL}^{(j-1)} - \rho c G_{AC}^{(j)} \quad (1 \leq j \leq n) \quad 8.$$

Equation (2) may be derived from equation (8) using the relationships (3) through (5).

For antiresonant couplers, the following relationships apply as long as $ka < 0.3$ where $a$ is the coupler radius and $k = 2\pi/\eta$, $\lambda$ being the wavelength of sound in the medium at the coupler antiresonant frequency.

$$Z_{AC} = \frac{(Z_{OC}^{(j)})^2}{R_{AR}} \quad (9)$$

and $$\left| \frac{P_{AC}}{Q_{AC}^{(j)}} \right| = Z_{OC}^{(j)} = \frac{\rho c}{A_{OC}^{(j)}} \quad (10)$$

The term $R_{AR}$ in equation (9) is the radiation resistance presented by the medium to the coupler mouth.

Equation (10) rearranged to state the volume current $Q_{AC}^{(j)}$ from the coupler into the radiation load is $$|Q_{AC}^{(j)}| = \frac{A_{OC}^{(j)}}{\rho c} P_{AC} \quad (11)$$

Thus, equation (11) shows that at antiresonance and for $ka < 0.3$ the volume currents $Q_{AC}^{(j)}$ are independent of load impedance but depend upon the cross-sectional areas $A_{OC}^{(j)}$. By insuring no standing waves and constant $P_{AC}$ along the transmission line and at the various drive ports, (by adjusting the interior cross-sectional areas of the line sections), the desired amplitudes of the $A_{OC}^{(j)}$ s can be obtained by selecting the proper $A_{OC}^{(j)}$ s.

An exemplary acoustic transmitter 200 embodying the features of the invention, which provides for amplitude shading of the radiation pattern, is schematically shown in FIG. 14. This transmitter includes a line 204 having several successive sections. This line is similar structurally to the line shown in FIG. 2 in that its sections have selected interior cross-sectional areas which are, in operation, filled with liquid and which provide nominally fixed driving pressures at each drive port 222, 224, 226, 218 and 228, and minimal reflection and standing waves. The first of these line sections 230 is coupled to a generator 201. The drive ports are nominally one wavelength apart. The topmost line section 231 may be a solid rod as explained for the top section 90 (FIG. 3).

Couplers 206, 208, 223, 210 and 212 are disposed coaxially around the line 204 at each of the drive ports 222, 224, 226, 218 and 228 respectively. These couplers are nominally one-half wavelength in axial length. Upper and lower halves of the axial length of each coupler are symmetrically disposed with respect to a plane perpendicular to the axis of the line through the center point of the line which in the case illustrated in FIG. 14 is the drive port 226. The coupler halves are nominally one-quarter wavelength in axial length. The annular cross-sectional area of each coupler half may be different. The coupler 202 at the center of the array is shown to have the same annular cross-sectional area in each half so as to satisfy the shading criteria selected for this exemplary case. Although five couplers are shown, more or less couplers may be used to satisfy the radiation pattern requirements desired for the transmitter. For beams to be steered in directions other than normal to the axis of the array (the line 204), suitable delays can be established by altering the separation of the couplers from the nominal one-wavelength value shown in FIG. 14. The illustrated array provides m output spots (2 spots for each drive port), at which acoustic energy emanates into the surrounding medium (viz., the sea water in the instant exemplary case.) The particular number of spots m from which the individual volume velocities $Q_{AC1,2}^{(j)}$ emanate (see FIG. 15) is determined from the acoustic signal level and pattern requirements (viz., beamwidth, steering angle, and side lobe levels). The $Q_{AC1,2}^{(j)}$ are dictated by the pattern requirements and can be derived by the application of known radiation pattern equations. For example, the amplitude distribution for a 12 spot array with Tschebycheff shading to achieve side lobes down 20 dB from the main lobe is contained in Table I.

TABLE I

12 Element (Spot) Array
Tschebyscheff Shading
Side lobes 20 dB down
Beamwidth = 9°(Nom) at 3 dB
Gain = 10.6 dB
Spot Spacing = $\lambda/2$

| Spot No. | Normalized Distr. ($Q_{AC}^{(j)}$) | Normalized Power $W_{AC}^{(j)}$ |
|---|---|---|
| 1 | 0.7127 | 0.0647 |
| 2 | 0.5530 | 0.0389 |
| 3 | 0.7090 | 0.0640 |
| 4 | 0.8453 | 0.0910 |
| 5 | 0.9463 | 0.1140 |
| 6 | 1.0000 | 0.1273 |
| 7 | 1.0000 | 0.1273 |
| 8 | 0.9463 | 0.1140 |
| 9 | 0.8453 | 0.0910 |
| 10 | 0.7090 | 0.0640 |
| 11 | 0.5530 | 0.0389 |
| 12 | 0.7127 | 0.0647 |

It will be noted that the $Q_{AC}^{(j)}$ s are normalized with respect to spots adjacent opposite sides of the center of the array. The absolute values of the $Q_{AC}^{(j)}$ s depend on the radiated power required and the maximum acoustic pressure allowed by cavitation considerations at the depth at which the transmitter is employed.

Using Equation (11), the $A_{OC}^{(j)}$ s are selected for each coupler. FIG. 15 illustrates the results for the coupler 210. $Q_{AC1}^{(j)}$ and $Q_{AC2}^{(j)}$ from the upper and lower halves of the coupler are provided from the pattern requirements. The $A_{OC1,2}^{(j)}$ s, which are the interior areas of the upper and lower coupler halves respectively, are selected using Equation (11), with regard for the level requirements and the cavitation threshold which together enable $P_{AC}^{(j)}$ to be set. The $A_{OC}^{(j)}$ s are made large enough to obtain adequate coupler bandwidth but not so large as to make the inner diameters of the coupler halves an appreciable fraction of a wavelength, if it is desired that the volume velocities be largely independent of the radiation load. Preferably the radius of the interior of each coupler half should be selected such that the following expression is satisfied.

$$\frac{2\pi A}{\lambda} \leq 0.3 \qquad (12)$$

where $\eta$ is the wavelength of the acoustic signal in the liquid in the line and $a$ is the radius of the coupler halves.

After the $A_{OC1,2}^{(j)}$ s are selected the driving point conductances $G_{AC1,2}^{(j)}$ presented by each coupler half are obtained.

$$G_{AC_{1,2}}^{(j)} = 0.25 \frac{A_{OC_{1,2}}^{(j)}}{\pi c}(2\pi\lambda a_{1,2})^2 \qquad (13)$$

Equation (13) is derived from Equation (9) and includes an explibit expression for the radiation resistance of the medium $R_{AR}$ in terms of the $j^{th}$ coupler radii, $a_1$ and $a_2$.

The total driving point conductance presented to the drive port 218 by each half of the coupler 210 is then obtained.

$$G_{AC}^{(j)} = G_{AC_1}^{(j)} + G_{AC_2}^{(j)} \qquad 14.$$

The area of the first line section 230 next to the generator 201 is obtained from the following equation which is obtained by combining equation (1) and (5).

$$A_{0L}^{(n)} = \frac{2\rho c\ W_{AC\ in}}{(P_{AC})^2} \qquad (15)$$

Using the values of $G_{AC}$ obtained from equation (14), the areas of each of the remaining transmission line sections are obtained from equation (8).

Referring to FIGS. 16 and 17 it will be observed how different groups of transmitters can be combined, in accordance with further features of the invention to provide planar (FIG. 16) and volumetric (FIG. 17) arrays.

The exemplary planar array shown in FIGS. 16 and 16a has four transmitters 254, 256, 258, and 260, each of which may be similar to the array shown in FIG. 2. Shaded transmitters of the type shown in FIG. 14 may also be used. The lines of these transmitters have their axes in a common plane. The array is therefore planar in nature and, in one embodiment, propagates a directional beam broadside (perpendicular to the plane) of the array. A bar 263 holds the lines in their common plane. The first sections 262, 264, 266 and 268 of each of these lines is connected to communicate with the inside of a chamber 270 at the upper end of the generator 250. In the embodiment above mentioned, these first line sections are of equal lengths. The array may be steered by adjusting the relative lengths of these first line sections 262, 264, 266, and 268. Such steering may be only a few degrees from broadside, or may extend to endfire in which case the major lobe of the beam extends in a direction in the plane of the array and normal to the individual lines. Additional or fewer transmitters may be included in the planar array to achieve desired radiation pattern requirements.

Figure 18:
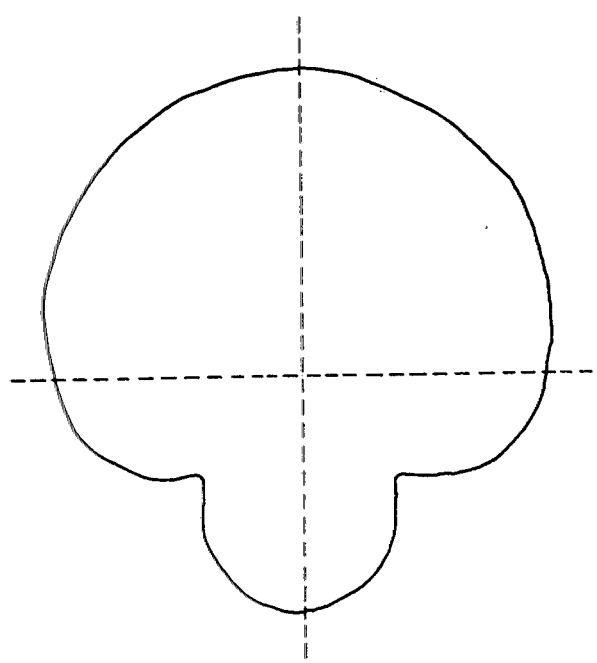
FIGS. 18 and 19 are horizontal and vertical radiation patterns produced by the transmitter array shown in FIGS. 17 and 17A.
Figure 19:
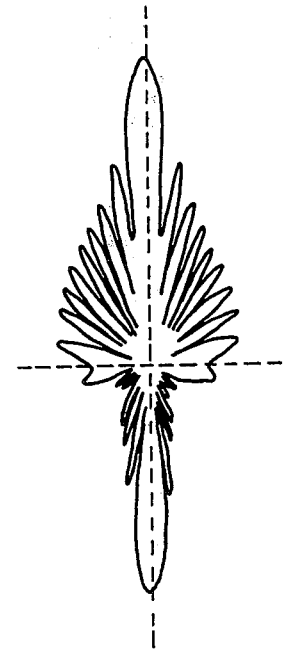

An exemplary volumetric array is shown in FIGS. 17 and 17A. The array contains three transmitters 274, 276, and 278 which may be of the type shown in FIG. 2 or in FIG. 14. The lines of these transmitters are spaced with their axes at the apexes of an equilateral triangle having sides $\lambda_o/3$ long, where $\lambda_o$ is the wavelength of the acoustic signal to be transmitted. A triangular support 289 holds the transmitters in spaced relation. A generator 252 is connected via a common chamber 280 to the first sections 282, 286, 288 of each line. In one embodiment, the cross-sectional areas of two of these first sections 282, 288 are equal, while the cross-sectional area of the remaining line first section 286 is 1.25 times greater than the others. The entire transmitters (viz., coupler and line) are correspondingly scaled. The length of the latter first line section 286 is also ⅓ of a wavelength longer than the lengths of the first sections 282, 288. For this configuration it can be shown that the unidirectional radiation pattern illustrated in FIGS. 18 and 19 is obtained, providing for a 10 dB front to back ratio and a beam width of 120° to the −3 dB points. FIG. 18 shows the pattern in a plane normal to vertical axes of the transmitters. The pattern shown in FIG. 19 is taken in a vertical plane including the line 278 which plane is normal to the vertical plane passing through the lines 274 and 276. Volumetric arrays according to the invention may have more than three transmitters as well as other spacings to provide selected control to satisfy various pattern width, beam steering and side lobe requirements.

For purposes of clarity in explaining the invention, the mathematical analysis herein is based upon a simplifying assumption that the losses within the transmission line sections and couplers are negligible, and that when no reflections occur at the ports the pressure is constant and has the same value along the line for beginning to end. Even in the absence of reflection, there may be in practice some variation in pressure amplitude along the line due, for example, to loss mechanisms in the fluid and in the boundary layer at the fluid-wall interface. These losses can result in a monotonically decreasing pressure amplitude along the transmission line. In most circumstances, this pressure reduction due to internal losses will in practice be negligible, and can be neglected. However, in cases where the reduction from end to end approaches several decibels as in extremely long lines or at very high pressure amplitudes and is not compensated for, some modification of the beam pattern may occur, including a steering or shifting of the axis of the main beam. Such unwanted beam steering may be compensated for by progressive increases in the diameter of the coupler annuluses (and a corresponding modification to the transmission line section areas to again minimize reflection.) Such relatively larger annuluses would be made large enough to produce the originally intended volume velocities in the presence of the reduced driving pressure.

From the foregoing description it will be apparent that there has been provided an improved acoustic source which is especially adapted for propagating acoustic energy directionally. Applications for the acoustic transmitter provided by the invention will be found in geophysical exploration, underwater signalling, and otherwise as a source of sonar energy under water. The principles of the invention, however, are generally applicable to the propagation of acoustic energy in any fluid medium both liquid and gaseous. It will also be appreciated that variations and modifications in the herein described apparatus, within the scope of the invention, will undoubtedly suggest themselves to those skilled in the art. Accordingly, the foregoing description should be taken merely as illustrative and not in any limiting sense.

What is claimed is:

1. An acoustic transmitter which comprises
    a. an acoustic transmission line having a plurality of ports disposed at spaced intervals along said line,
    b. means included in each section of said line on opposite sides of each of said ports and around each of said ports for preventing reflection of acoustic energy within said line at each of said ports, and
    c. a source of acoustic energy coupled to one end of said line for driving said line.

2. An acoustic transmitter which comprises
    a. an acoustic transmission line having a plurality of ports disposed at spaced positions along said line,
    b. means included in each line and external thereto for providing substantially equal values of acoustic driving pressure at each of said ports when acoustic pressure of the same value as each of said substantially equal values is applied to one end of said line,
    c. a source of acoustic energy for providing acoustic input pressure at one end of said line of the same value as each of said equal values.

3. An acoustic transmitter which comprises
    a. an acoustic transmission line having a plurality of ports disposed at positions spaced successively along said line, so as to define successive line sections disposed on opposite sides of each of said ports, said ports each having a driving point admittance $Y_{AC}^{(j)}$, each of said line sections succeeding each of said ports having an admittance $Y_{AC}^{(j)}$, each of said line sections preceding each of said ports having a characteristic admittance $Y_{OL}^{(j-1)}$,
    b. means for providing said line sections with the acoustic parameters which satisfies the following equation $$Y_{OL}^{(j-1)} = Y_{AC}^{(j)} + Y_{AL}^{(j)}, \text{ and}$$

c. means for applying an acoustic signal to the input of a line section at one end of said line for driving said line.

4. An acoustic transmitter which comprises
    a. a source of acoustic energy,
    b. an acoustic transmission line having a plurality of ports disposed at spaced positions along said line for extracting acoustic energy from said line at each of said ports, successive sections of said line being disposed on opposite sides of successive ones of said ports, the first section of said line being disposed at one end of said line and being coupled to said source, and
    c. means provided in each of said successive sections of said line for presenting to the preceding section of said line an acoustic impedance which together with the acoustic impedance of the port therebetween equals the characteristic acoustic impedance of the preceding section of said line.

5. The invention as set forth in claim 4 including a plurality of coupler members each disposed at a different one of said ports for presenting each of said ports with a resistive driving point impedance.

6. The invention as set forth in claim 4 wherein said line is a cylinder and each successive section of the line after the first section has a cross-sectional area determined by multiplying the cross-sectional area of said first section of said line by the following factor:

$$n - j/n$$

where $n$ is the total number of said ports and $j$ is the number of ports disposed between said source and the section the area of which is being determined.

7. The invention as set forth in claim 6 wherein said cylinder is a tube having the cross-sectional areas of the openings therethrough in each of said sections determined by multiplying the area of the opening in said first section by said factor.

8. The invention as set forth in claim 7 including a plurality of coupler members each disposed at a different one of said ports for presenting each of said ports with a high acoustic impedance, said coupler members each being an annular member spaced from said tube to define a substantially open annulus therebetween.

9. The invention as set forth in claim 8 wherein said sections are separated from each other to define intersection annular gaps which provide said ports.

10. The invention as set forth in claim 9 wherein the opposite ends of said couplers are equidistant from the ones of said gaps at which they are disposed.

11. The invention as set forth in claim 5 wherein said sections are spaced from each other to define gaps therebetween; which provide said ports, said gaps being spaced from each other by predetermined distances.

12. The invention as set forth in claim 11 wherein said predetermined distances are one wavelength or an integral multiple thereof at the speed of sound in the interior of said line at the frequency of said acoustic energy.

13. The invention as set forth in claim 11 wherein said couplers are antiresonant and present a high impedance at said frequency at said gaps.

* * * * *